United States Patent [19]

Bath et al.

[11] Patent Number: 4,476,966

[45] Date of Patent: Oct. 16, 1984

[54] HYDRAULIC CRANE HOIST CONTROL LEVER VELOCITY LIMITING DEVICE

[76] Inventors: William R. Bath; Danny Be'er, both of 6116 Cunningham, Houston, Tex. 77041

[21] Appl. No.: 499,368

[22] Filed: May 31, 1983

[51] Int. Cl.[3] ............................................ F16F 9/49

[52] U.S. Cl. .................................... 188/280; 188/269

[58] Field of Search ................................ 188/290-296, 188/266, 272, 278, 279, 281, 283, 297, 269, 180, 280, 67, 265, 82.1-82.9; 267/136, 137; 74/25, 112, 491, 504, 523; 192/4 R, 4 C

[56] References Cited

U.S. PATENT DOCUMENTS

| | | | |
|---|---|---|---|
| 2,871,995 | 2/1959 | Cline | 188/265 X |
| 3,552,518 | 1/1971 | Aidner et al. | 188/265 X |
| 3,572,363 | 3/1971 | Roach | 188/280 X |
| 3,710,904 | 1/1973 | Boyer et al. | 188/265 X |
| 3,739,808 | 6/1973 | Landherr | 188/280 X |
| 3,746,403 | 7/1973 | Jones et al. | 188/265 X |
| 3,991,659 | 11/1976 | Robinson | 188/280 X |
| 3,991,989 | 11/1976 | Brandis | 188/280 X |
| 4,116,113 | 9/1978 | Leclerc | 188/265 X |

*Primary Examiner*—Douglas C. Butler

*Attorney, Agent, or Firm*—Pravel, Gambrell, Hewitt & Kimball

[57] ABSTRACT

An apparatus for controlling hoist control lever velocity on hydraulic cranes. The device is connected to the hoist control lever via a linkage. The device contains a housing which defines a fluid circuit. A slidably mounted pressurizing component communicates with the fluid circuit and is connected to the linkage. The fluid circuit contains a flow restricting device. When the hoist control lever is moved from a first position, wherein the hoist is stationary to a second position, wherein the hoist is moving, the linkage exerts an inward force on the pressurizing component moving the pressurizing component from a neutral to a pressurizing position. Such movement in turn induces a pressure build-up within the fluid circuit. Flow restricting device within the fluid circuit exerts a back pressure on the pressurizing component thereby through the actions of a the pressurizing component and the linkage limits the velocity of the hoist control lever. Biasing device acting on the pressurizing component provides an outward force to aid in return of the pressurizing component from a pressurizing position to a neutral position.

12 Claims, 4 Drawing Figures

Fig. 1
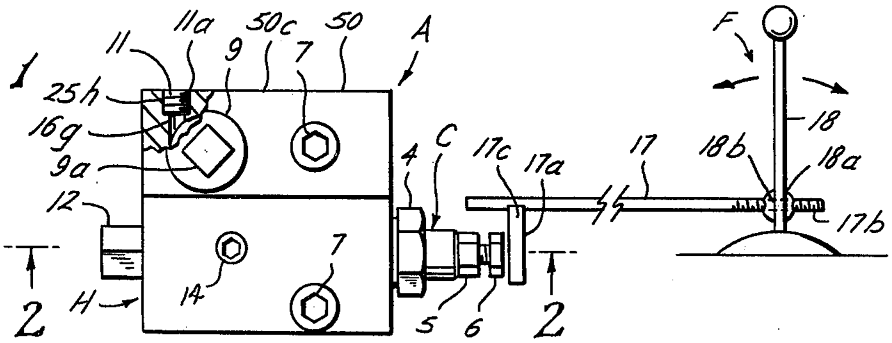
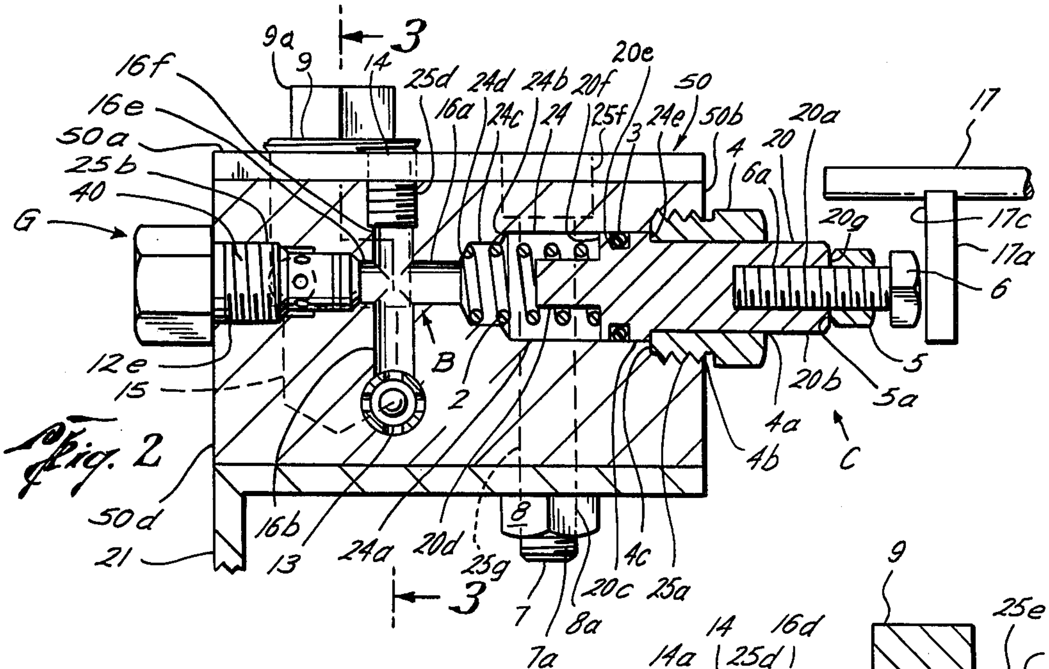
Fig. 2
Fig. 3
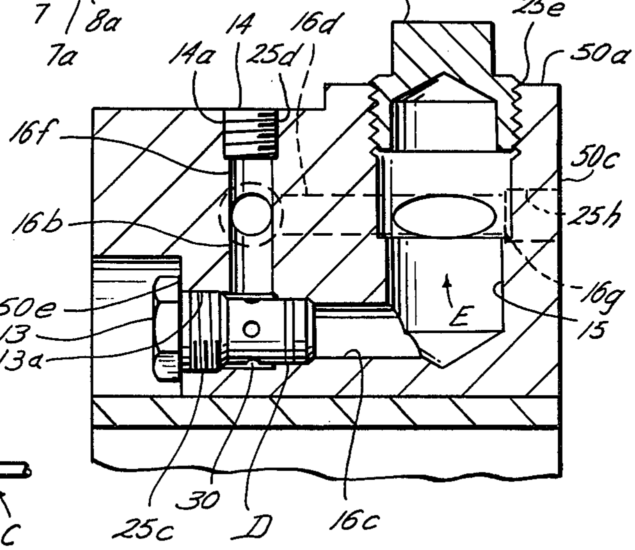
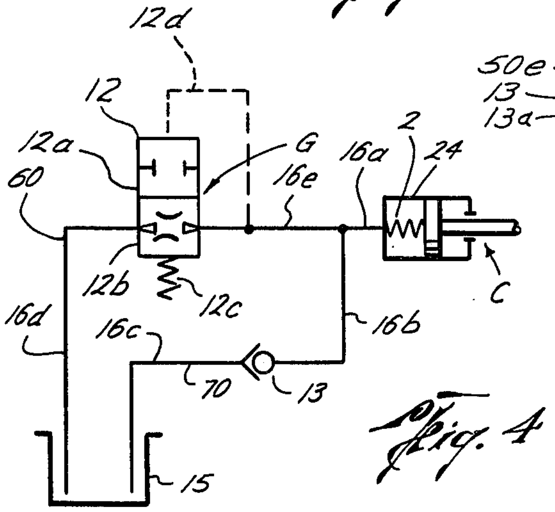
Fig. 4

HYDRAULIC CRANE HOIST CONTROL LEVER VELOCITY LIMITING DEVICE

FIELD OF INVENTION

The invention relates to a device for limiting the velocity of movement of a control handle used to regulate hoist speed on modern hydraulic cranes.

BACKGROUND OF THE INVENTION

Many operators of modern hydraulic cranes were trained on mechanical cranes. The operating techniques for mechanical cranes are not directly transferable to todays modern hydraulic cranes. In the hoisting operation, mechanical crane operators have always been taught to idle the engine and engage the control as fast as possible to avoid slipping the clutch. At the same time, the operator used the accelerator to vary the hoist speed. The technique required on hydraulic cranes is different from that required on mechanical cranes. On the hydraulic crane the operator keeps the engine at a high idle and varies the hoist speed by moving the control lever from its normal, neutral, position to a pressurizing position.

There are two problems related to rapid movement of a hoist control lever on a hydraulic crane. The first type of problem arises when the operator lowers an empty hook or crown block. If the operator moves the control lever too fast, the hoist drum accelerates faster than the wire rope can be pulled off the drum by the weight of the empty hook, ball or crown block. If the operator suddenly stops the downward motion by returning the control lever to its neutral position, the excess wire already fed off the hoist drum tends to whip. The whipping action tends to force the wire rope to jump to the next layer or groove on the hoist drum. As a result, the wire rope wears quickly. In contradistinction, when the operator handles a heavy load, rapid movement of the hoist control lever results in a sudden pressure buildup in the hydraulic system. The tie-down bolts securing the hydraulic pumps and motors are heavily stressed as a result of the sudden pressure buildup in the hydraulic system. In addition, the mechanical drive train components are also stressed as a result of the sudden acceleration of the hoist drum.

SUMMARY OF THE INVENTION

The present invention relates to a new and improved apparatus for controlling movement of hoist control levers on hydraulic cranes. The apparatus features a housing defining a fluid circuit, having a slidably mounted pressurizing component communicating therewith on one end thereof and linked to a crane control lever on the other end thereof, for restricting rapid movement of the crane control lever from a first position where the hoist is stationary to a second position where the hoist is moving. The slidably mounted pressurizing component is biased to return from the pressurizing position wherein hoist control lever is in the second position to the neutral position wherein hoist control lever is in the first position.

BRIEF DESCRIPTION OF THE DRAWINGS

FIG. 1 is a planar, partially schematic, partially sectional view of the apparatus of the present invention;

FIG. 2 is a sectional, elevational view of the apparatus of the present invention, as illustrated in FIG. 1, taken along lines 2—2;

FIG. 3 is a sectional, end view of the apparatus of the present invention as illustrated in FIG. 2, taken along lines 3—3; and, FIG. 4 is a schematic drawing of the fluid circuit contained in the housing of the apparatus of the present invention, as shown in FIG. 1.

DETAILED DESCRIPTION OF A PREFERRED EMBODIMENT

In the drawings, the letter A designates generally the apparatus used to control the velocity of a crane control lever F of the present invention. The apparatus A includes generally a housing H having a fluid circuit B formed therein. The apparatus A further consists of four sub-assemblies: a pressurizing component C; a ball check valve D; a reservoir E; and a variable flow restricting means G.

The housing H of the apparatus A, which includes housing 50, is preferably manufactured from a solid piece of steel or any other suitable high strength material. Housing 50 has a top surface 50*a*, a pressurizing cavity surface 50*b*, a back surface 50*c*, flow restriction valve mounting surface 50*d* and a check valve mounting surface 50*e*. The fluid circuit B contained in housing H is composed of various sub-parts more fully described hereinbelow. A horizontal pressurizing cavity 24 is defined by cylindrical bore 24*a*. Cylindrical bore 24*a* is further reduced in size at tapered surface 24*b*. Horizontal pressurizing cavity 24 then further extends into housing H along bore 24*c* to tapered surface 24*d* at which point horizontal pressurizing cavity 24 meets passage 16*a*. At the opposite end of horizontal pressurizing cavity 24 and extending out to the surface 50*b*, cylindrical bore 24*a* is enlarged by threaded counterbore 25*a*.

Passage 16*a* extends from tapered surface 24*d* to the intersection of passages 16*b*, 16*e* and 16*f*. Passage 16*b*, a part of the vacuum relief path 70, extends from said intersection in a downward direction to cavity 30 wherein ball check valve D is mounted. Passage 16*c*, a part of the vacuum relief path 70, extends from reservoir 15 to cavity 30 wherein ball check valve D is mounted. Passage 16*e*, a part of the controlled flow path 60, extends horizontally from said intersection to cavity 40 wherein variable flow restricting means G is located. Passage 16*f* extends upwardly from said intersection to surface 50*a* the top of housing 50. Passage 16*d*, a part of the controlled flow path 60, extends horizontally from cavity 40 to reservoir 15. Passage 16*g* extends horizontally from reservoir 15 to threaded bore 25*h* in housing surface 50*c*. Therefore, fluid circuit B comprises a controlled flow path 60 from pressurizing cavity 24 to reservoir 15 and a vacuum relief path 70 from reservoir 15 to pressurizing cavity 24. The controlled flow path consists of passage 16*e*, cavity 40 wherein variable flow restricting means is mounted and passage 16*d*. Vacuum relief path 70 consists of passage 16*c*, cavity 30, wherein check valve D is mounted and passage 16*b*. Passage 16*a* common to controlled flow path 60 and vacuum relief path 70 and connects both paths 60 and 70 to pressurizing cavity 24.

The pressurizing component C of the apparatus A, includes a piston generally described as 20, which is slidably mounted for horizontal movement in pressurizing cavity 24 which extends through housing surface 50*b*. Piston 20 is preferably a cylindrical member having three different cross sections. Outer section **20*b* protrudes through a bore 4*a* in securing nut 4. Securing nut 4 has a threaded component 4*b* for releasable connection with housing surface 50*b* via threaded counterbore 25*a*. Center section 20*c* of piston 20 is machined to slide horizontally in cylindrical bore 24*a*. Shoulder 24*e* formed at the transition between outer section 20*b* and center section 20*c*, limits outer movement of piston 20 when it contacts surface 4*c* on securing nut 4 and defines the fully biased neutral position of pressurizing component C. A circumferential groove 20*e* located in center section of piston 20*c* contains a resilient sealing ring 3 to prevent leakage from horizontal pressurizing cavity 24. The transition between center section 20*c* and inner section 20*d* on piston 20 defines shoulder 20*f*. Biasing means 2 imparts an outward force on piston 20 by application of force to shoulder 20*f*. The other end of biasing means 2 bears against tapered surface 24*d*. Inner section 20*d* of piston 20 is located completely inside the helix of biasing means 2 thereby guiding and preventing lateral distortions of said biasing means 2. Surface 20*g* on outer section 20*b* of piston 20, contains a threaded bore 20*a*. Lockable overall length adjusting bolt 6 is adjustably secured to outer section 20*b* via the interaction of threads 6*a* of lockable overall length adjusting bolt 6 and threaded bore 20*a*. Lock nut 5 secures the position of lockable overall length adjusting bolt 6 when surface 5*a* of said lock nut is in contact with surface 20*g* of outer section 20*b* of piston 20**.

A ball check valve D, of a type well known in the art, is releasably secured to cavity 30 by the connection of threads **13*a* located on said ball check valve D with threads 25*c* located in cavity 30 at recessed housing surface 50*e***.

Fluid Circuit B is filled with a suitable fluid and hermetically sealed. An air gap is left above the oil level in reservoir 15. Reservoir 15 is covered by cap 9 which is detachably mounted to housing surface **50*a* in bore 25*e*. Cap 9 has a vertically protruding extension 9*a*, preferably square in configuration, to facilitate installation and removal. Plug 11 is located at one end of passage 16*g*. Threads 11*a* located on plug 11 engage threaded bore 25*h* at housing surface 50*c*. Plug 11** is designed to cover a hole made during the machining process.

Variable flow restricting means 12 is releasably secured in cavity 40 by the interaction of threads **12*e* with internal threads 25*b* located in cavity 40 at housing surface 50*d*. The operation of variable flow restricting means G, a differential pressure sensitive variable orifice valve, a device well known in the art, can best be illustrated by referring to FIG. 4**.

In FIG. 4 variable flow restricting means G also referred to as 12 is illustrated in the fluid circuit between passage **16*e* and passage 16*e*. The normal position of variable flow restricting means 12 is shown by 12*b*. In this position restricting means 12 offers little resistance to flow. Spring 12*c* holds variable flow restricting means 12 in the normally opened position. A pressure buildup in passage 16*e* causes variable flow restriction means 12 to move into the closed position as illustrated by 12*a*. This condition occurs when the fluid pressure in passage 16*e* overcomes the spring force of spring 12*c*. Should the pressure decrease in passage 16*e* spring forces exerted by spring 12*c* put variable flow restriction means 12 back into the normally open position 12*b*. Movement from the closed position 12*a* back to open position 12*b* is accomplished by displacing fluid into exhaust line 12*d* which is internal to variable flow restricting means 12**.

In order to use the apparatus to control crane lever velocity, it must be securely mounted to a suitable frame. Mounting bracket 21 is provided for securing the apparatus to a suitable fixed object. Housing H of the apparatus A contains a plurality vertical bores **25*g* which do not communicate with fluid circuit B. A counter-bore 25*f* is located at the top of each of said bores 25*g* at housing surface 50*a*. A base plate securing bolts 7 is inserted through vertical bore 25*g* and a hole (not shown) in mounting bracket 21. Nut 8 releasably holds mounting bracket 21 to housing H via the interaction of threads 7*a* on base plate securing bolts 7 and threads 8*a* located on nut 8. After insertion, the tops of base plate securing bolts 7 are flush with housing surface 50*a* due to counterbore 25*f***.

A typical crane control lever assembly F is connected to the apparatus A via linkage means 17. Crane control lever assesmbly F consists of control lever 18 which is pivotally mounted to a suitable frame (not shown) and contains a yoke **18*a* to which linkage means 17 is releasably secured. Linkage means 17 is releasably secured to control lever 18 via the interaction of internal threads 18*b* located within yoke 18*a* and threads 17*b* on said linkage means 17. Pivotal motion of control lever 18 is translated into translational motion of linkage means 17. Translational motion of linkage means 17 causes tab 17*a* of linkage means 17 to push against adjusting bolt 6** thereby activating the apparatus A by moving pressurizing component C.

Movement of a hydraulic crane hoist control lever 18 from a first position where the hydraulic crane hoist is stationary to a second position where the hydraulic crane hoist is moving actuates the linkage means 17 which is connected to the hoist control lever and piston 20 of pressurizing component C thereby causing inward motion of piston 20. This inward motion of piston 20 of pressurizing component C from the neutral position to the pressurizing position raises fluid pressure in horizontal pressurizing cavity 24 which initiates fluid flow from horizontal pressurizing cavity 24 into passage **16*a*. Fluid flow into passage 16*b* is prevented by the closing of ball check valve 13. Simlarly, there is no fluid flow in passage 16*f* because threads 14*a* on plug 14, releasably connected to threads 25*d* in passage 16*f* where it meets surface 50*a*, effectively provide no outlet. Therefore, the only passage available for fluid flow is 16*e*. In order for fluid in passage 16*e* to reach reservoir 15, it must pass through variable flow restricting means G located in cavity 40. The displaced fluid flows into reservoir 15**, wherein it compresses the air pocket (not shown) above the fluid level (not shown).

If the operator lets go or pulls back on control lever 18, biasing means 2 exerts an outward force on pressurizing component C thereby causing the lockable overall length adjusting bolt 6 to push against surface **17*c* which in turn through linkage means 17 forces control lever 18 back to its neutral position. Outward motion of piston 20 reduces pressure in horizontal pressurizing cavity 24. In order to restore pressure and allow piston 20 to move outwardly, fluid is drawn from reservoir 15 through passage 16*c* into cavity 30. Flow from the reservoir 15 is also induced by expansion of previously compressed gas trapped above the fluid level (not shown). Check valve 13 permits flow in only one direction from passage 16*c* to passage 16*b*. Therefore, to relieve the vacuum in horizontal pressurizing cavity 24** caused by outward motion of the piston 20, flow is established from reservoir 15 into horizontal pressurizing cavity 24 via passage 16c, ball check valve 13, passage 16b, and passage 16a.

As can readily be seen, the apparatus A restricts the crane operator from rapidly moving the control lever 18. As long as control lever 18 is moved slowly there will be no pressure buildup in fluid circuit B because variable flow restricting means 12 is sufficiently open to allow fluid to pass to reservoir 15 at the same rate as it is being displaced by piston 20. However, rapid motion of control lever 18 will cause variable flow restricting means 12 to begin closing thereby restricting fluid flow. The pressure buildup ensuing in fluid circuit B will resist inward movement of pressurizing component C thereby offering progressively more resistance to movement of control lever 18. If the crane operator moves control lever 18 suddenly, variable flow restricting means 12 will completely close and the apparatus A will offer complete resistance to any further movement of control lever 18. In this situation, the operator is required to momentarily release the control lever 18 which reduces fluid circuit B pressure thereby allowing variable flow restricting means 12 to begin to open. Once variable flow restricting means 12 begins to open, it will be possible for the operator to resume forward motion of the control lever 18. The other desirable feature of the apparatus A is that offers no resistance and in fact promotes a quick return of control lever 18 to its neutral position.

It it clear that a crane owner can control crane down time and repair cost by insisting his employees properly operate the equipment. Rather than re-training all of its operators, a crane owner can install a control lever velocity limiting device which is the subject of this invention. The velocity limiting device forces the operator to move the handle slowly and smoothly to allow the hydraulic system time to develop operating pressure without a spike and prevents whip caused by rapidly lowering a light load or damage to the drive train mechanism when handling a heavy load.

It is to be understood that the forms of the invention herein shown and described are to be taken as preferred examples of the same and that various other changes in the shape, size, and arrangement of parts may be resorted to without departing from the spirit of the invention.

Having thus described the invention, what is claimed is:

1. A device for limiting the velocity of movement of a control lever of a hydraulic crane hoist from a first position where the hydraulic crane hoist is stationary to a second position where the hydraulic crane hoist is moving, comprising:

a housing formed having a fluid circuit therein;

a pressurizing cavity formed within said fluid circuit and communicating with the exterior of said housing;

a pressurizing component slidably mounted within said pressurizing cavity;

linkage means operably connected with the control lever and said pressurizing component for transmitting movement of the control lever to said pressurizing component;

said pressurizing component pressurizing said fluid circuit when said pressurizing component is moved from a neutral position where the control lever is in the first position to a pressurizing position where the control lever is moved from the first position toward the second position;

biasing means within said pressurizing cavity in engagement with said pressurizing component for biasing said pressurizing component towards said neutral position; and, flow restricting means in said fluid circuit for limiting the velocity of movement of said pressurizing component from said neutral position to said pressurizing position for regulating the hydraulic crane hoist operations.

2. The device of claim 1, wherein:

said fluid circuit includes a reservoir.

3. The device of claim 2, wherein said fluid circuit includes:

a controlled flow path connecting said pressurizing component with said reservoir.

4. The device of claim 3, wherein said flow restricting means includes:

a differential pressure sensitive variable orifice valve mounted in said controlled flow path thereby regulating flow from said pressurizing cavity into said reservoir for unidirectionally restricting movement of the hydraulic crane control lever.

5. The device of claim 4, wherein said fluid circuit includes:

a vacuum relief path connecting said reservoir with said pressurizing cavity.

6. The device of claim 5, wherein said flow restricting means includes:

a check valve positioned in said vacuum relief path allowing flow in one direction from said reservoir to said pressurizing cavity when said pressurizing component is moved from the pressurizing to the neutral position thereby permitting unrestricted movement of said pressurizing component from the pressurizing position to the neutral position.

7. The device of claim 6, wherein:

said biasing means comprises a coil spring.

8. The device of claim 7, wherein said pressurizing component includes:

a lockable overall length adjusting bolt for eliminating gaps between said linkage means and said pressurizing component.

9. The device of claim 8, wherein said pressurizing component includes:

a cylindrical inner section.

10. The device of claim 9, wherein said pressurizing component includes:

a shoulder defined by said cylindrical inner section to which said coil is detachably connected spring thereby placing said cylindrical inner section within said coil spring preventing lateral distortions of said coil spring.

11. The device of claim 10 wherein said linkage means includes:

a demountable connection to said control lever thereby translating pivotal motion of said lever into horizontal motion of said pressurizing component.

12. The device of claim 11 wherein said reservoir includes:

a non-vented air gap whereby movement of said control lever from said first position to said second position is resisted due to compression of said air gap and movement of said control lever from said second position to said first position is biased by expansion of said air gap.

* * * * *